(12) United States Patent
Kahler et al.

(10) Patent No.: US 6,739,473 B2
(45) Date of Patent: May 25, 2004

(54) GRILL IMPLEMENTS WITH REMOVABLE HANDLE

(75) Inventors: Andrew Kahler, Columbus, GA (US); John R. Holman, Columbus, GA (US); Ryan Neal, Midland, GA (US)

(73) Assignee: W.C. Bradley Company, Columbus, GA (US)

( * ) Notice: Subject to any disclaimer, the term of this patent is extended or adjusted under 35 U.S.C. 154(b) by 153 days.

(21) Appl. No.: 10/143,462

(22) Filed: May 10, 2002

(65) Prior Publication Data

US 2003/0208884 A1 Nov. 13, 2003

(51) Int. Cl.[7] ............................................. B65D 25/28
(52) U.S. Cl. ........................................ 220/759; 16/425
(58) Field of Search ................. 220/759, 760, 220/776; 16/425; 294/34, 31.1

(56) References Cited

U.S. PATENT DOCUMENTS

| | | | | |
|---|---|---|---|---|
| 735,516 A | * | 8/1903 | Horton | 220/759 |
| 1,039,261 A | * | 9/1912 | Cornwell | 220/759 |
| 1,943,585 A | * | 1/1934 | Cummins et al. | 220/759 |
| 2,044,388 A | * | 6/1936 | Edward | 220/759 |
| 3,297,349 A | * | 1/1967 | Pryce | 294/2 |
| 3,420,401 A | * | 1/1969 | Maslow | 220/759 |
| 3,731,840 A | * | 5/1973 | Beutler et al. | 220/570 |
| 4,019,221 A | * | 4/1977 | Baumgarten | 220/759 |
| 4,026,435 A | * | 5/1977 | Hendon | 220/743 |

* cited by examiner

*Primary Examiner*—Joseph Man-Fu Moy
(74) *Attorney, Agent, or Firm*—James W. Kayden; Thomas, Kayden, Horstemeyer & Risley, LLP

(57) ABSTRACT

A removable handle for use with a cooking implement, including a grip portion with a top surface, a bottom surface, a front end, and a back end. A support post wire with a first support post end and a second support post end, the first and said second support post ends being parallel, is securely attached to the grip portion. A lock wire with a hook end and an anchor end is securely attached to the grip portion. A button is disposed in the grip portion, the button being arranged and configured to deflect the hook end downwardly. The first and the second support post ends are arranged and configured for insertion into a pair of support recesses disposed on the cooking implement, and the hook end is arranged and configured to engage a portion of the cooking implement.

20 Claims, 6 Drawing Sheets

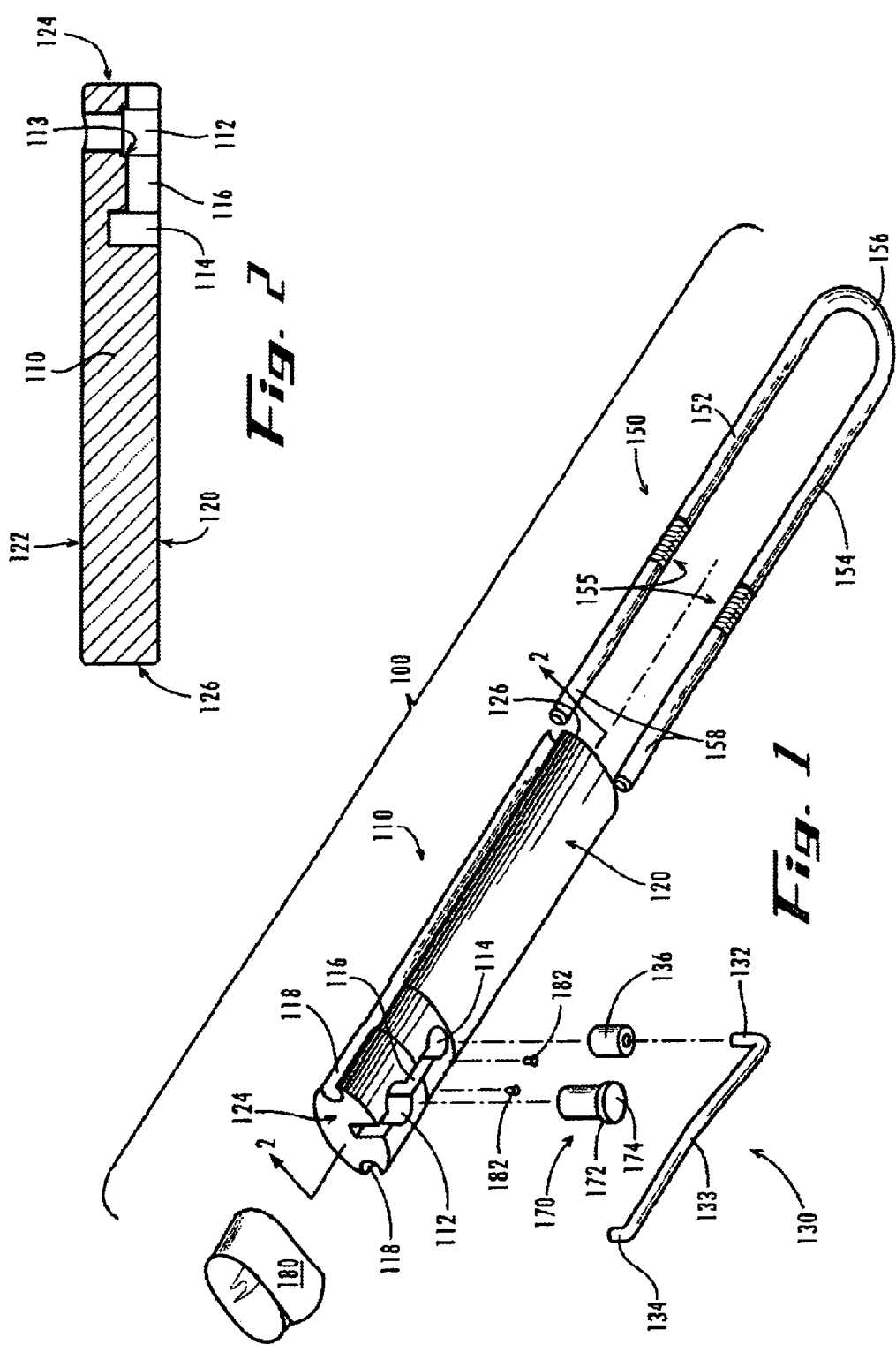

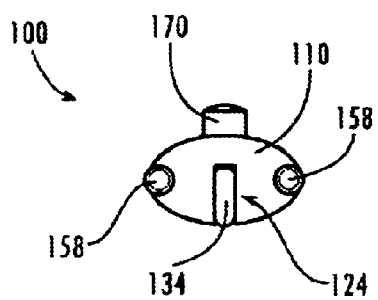
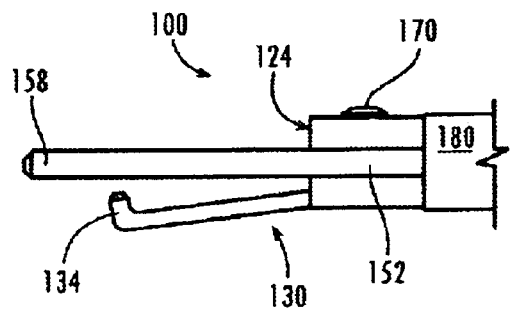
Fig. 3D  Fig. 3E
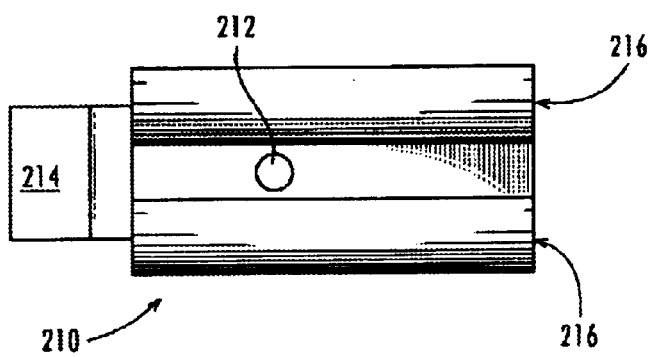
Fig. 4A
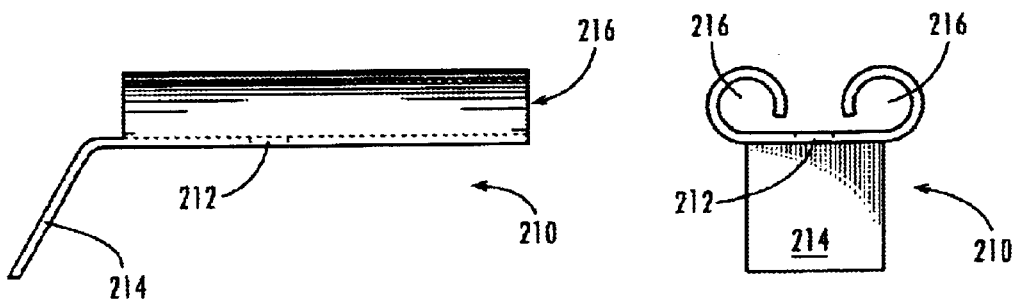
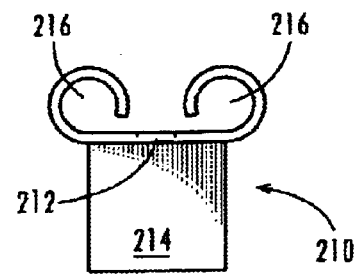
Fig. 4B  Fig. 4C

GRILL IMPLEMENTS WITH REMOVABLE HANDLE

FIELD OF THE INVENTION

The invention relates to implements for use in cooking and, more particularly, to an improved removable handle for use with those implements.

BACKGROUND OF THE INVENTION

Quite often, it is desirable to make handles for cooking implements, such as pots, pans, skillets, fry baskets, etc., out of materials that are different than those materials used to construct the implement. This can be because an insulative material is desired, a more comfortable material to grasp is desired, a material possessing certain ornamental aspects is desired, or for any number of other reasons. Frequently, these materials are not as durable as those materials used to construct the actual portions of the implement that are directly exposed to the heating surfaces used. In addition, the materials used to construct the handle often do not withstand the harsh environment inside a dishwasher very well.

A major problem that has been observed with cooking implements having handles constructed of materials other than those used to construct the implement is that when the materials used to manufacture the handles becomes worn, as noted above, the handle may become unusable and necessitate replacement of the entire implement. Even in those situations where the handle remains usable, but is unsightly, the owner of the implement may choose to replace the implement at significant cost.

Cooking implements with removable handles offer a myriad of advantages over traditional cookware with fixed handles. A removable handle that can be used with a number of cooking implements permits the user to own only one handle for the numerous implements that he or she may own. Removable handles greatly reduce the storage space required when the implements are not being used. Along similar lines, removable handles permit manufacturers of these implements to save money on shipping the products because reduced space required for packaging translates into reduced costs for getting products to market. In use, such as when cooking on a barbecue grill where space is often at a premium, removable handles allow more effective use of the cooking surface. Furthermore, removable handles increase safety in that without handles extending beyond the edge of the cooking surface being used, the potential for spill type accidents is greatly reduced.

Although removable handles do exist for cookware, prior art attempts are often plagued by problems like not attaching securely enough to the cookware. It is to these and other problems and deficiencies in the prior art that the present invention is directed.

SUMMARY OF THE INVENTION

In accordance with the present invention, a removable handle is provided that firmly and securely attaches to the associated cooking implements. The removable handle includes a grip portion with a top surface, a bottom surface, a front end, a back end, a button orifice, a mounting orifice, and a pair of support post grooves disposed on opposing sides of the grip portion that run longitudinally between the front end and the back end. A lock wire with a hook end and an anchor end is included, the anchor end is disposed in the mounting orifice and the hook end is configured to engage the cooking implement. A support post wire with a first length, a second length, a loop portion therebetween, and a pair of support post ends configured for insertion into the cooking implement is attached to the grip portion such that each of the first length and the second length is disposed in one of the pair of support post grooves. A button is disposed in the button orifice and is arranged and configured to deflect the hook end between an engaged position and a disengaged position. A metal band is disposed around the grip portion such that the first and the second lengths are secured in the pair of support post grooves and the anchor end is secured in the mounting orifice.

Embodiments of the present invention also include methods of attaching removable handles to grilling implements. One preferred embodiment includes pressing and holding a button such that a lock wire having a hook end is deflected into a disengaged position. After having deflected the lock wire, a pair of support ends is inserted into a pair of support recesses formed in the cooking implement. The button is then released and the lock wire returns to an engaged position wherein the hook end engages a retention member.

These and other objects and advantages of the present invention will become apparent upon reading the following description, the illustrative embodiments describing the principles of the present invention with reference to the attached drawings, wherein like reference numerals have been used to refer to like parts throughout the several figures.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 shows an exploded perspective view of the removable handle of the present invention, showing a preferred embodiment.

FIG. 2 shows a cross-section of the grip portion of the removable handle shown in FIG. 1, the section being taken along line II—II of FIG. 1.

FIGS. 3A–3E show top plan, side elevational, bottom plan, front end elevational, and partial, side elevational views, respectively, of the removable handle shown in FIG. 1.

FIGS. 4A–4C show top plan, side elevational, and back end elevational views, respectively, of an attachment bracket of the present invention for use with the removable handle shown in FIGS. 3A–3E.

Figure 3A:
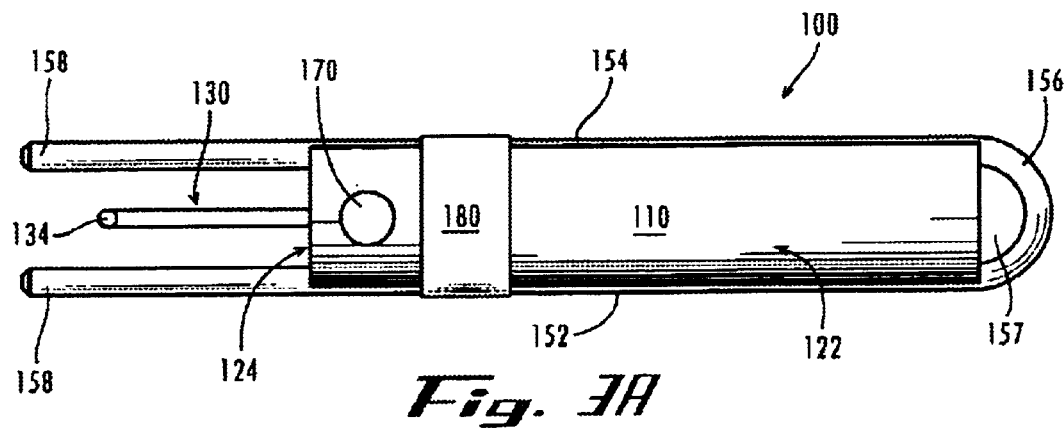

Reference will now be made in detail to the description of the removable handle for use with grilling implements as illustrated in the drawings. While the removable handle for use with grilling implements will be described in connection with these drawings, there is no intent to limit it to the embodiment or embodiments disclosed therein. On the contrary, the intent is to cover all alternatives, modifications and equivalents included within the spirit and scope of the removable handle for use with grilling implements as defined by the appended claims.

DETAILED DESCRIPTION

Referring now to the drawings, FIG. 1 shows a exploded bottom perspective view of one preferred embodiment of the removable handle 100 of the present invention. The removable handle includes a grip portion 110, a lock wire 130, a support post wire 150, a button 170 and a metal band 180. Although the grip portion 110 can be constructed of numerous materials, wood is preferably used in the preferred embodiment.

The grip portion 110 includes a button orifice 112, a mounting orifice 114, a lock wire channel 116 and a pair of support grooves 118. The pair of support grooves 118 are formed on opposing sides of the grip portion 110 and extend longitudinally from the back end 126 to the front end 124. The button orifice 112 and the mounting orifice 114 are both formed in the bottom surface 120 of the grip portion 110. As can best be seen in FIG. 2, the button orifice 112 extends from the bottom surface 120 to the top surface 122 of the grip portion 110, while the mounting orifice 114 terminates prior to reaching the top surface 122. The lock wire channel 116 is also formed in the bottom surface 120, extending from the mounting orifice 114, passing through the button orifice 112 and terminating at the front end 124.

Referring back to FIG. 1, the lock wire 130 includes an anchor end 132 and a hook end 134. The anchor end 132 is arranged and configured to engage the mounting orifice 114, and thereby help secure the lock wire 130 in the grip portion 110. The hook end 134 is bent upwardly and is arranged and configured to engage a retention member (not shown) of a cooking implement. The support post wire 150 includes a first length 152, a second length 154, a loop portion 156 formed therebetween, and a pair of support post ends 158. The first length 152 and the second length 154 are parallel to each other and terminate with the pair of support post ends 158. Preferably, each of the first and second lengths 152, 154 includes a knurled portion 155. The knurled portions 155 are configured to frictionally engage the pair of support post grooves 118, thereby preventing any potential slippage of the support post wire 150 during use.

Figure 3B:
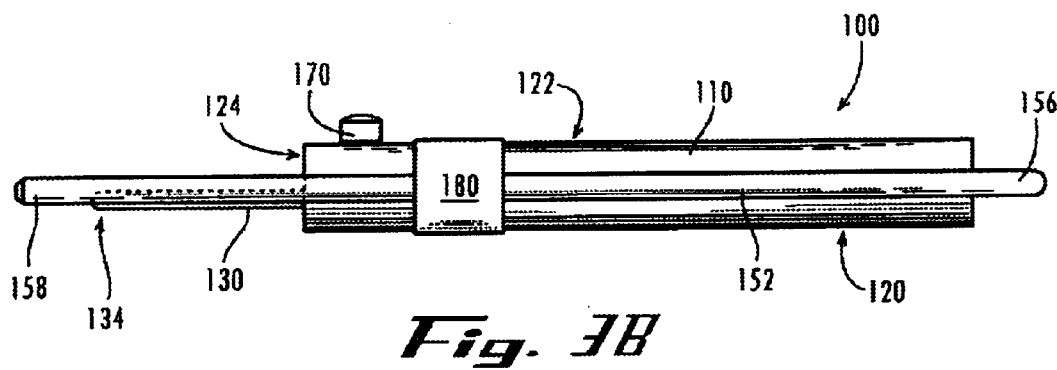

To assemble the removable handle 100, the button 170 is placed in the bottom orifice 112. Preferably, the button orifice 112 includes a ridge 113 (FIG. 2) that engages a lip 172 on the button 170, thereby retaining the button 170 in the button orifice 112. Next, the lock wire 130 is positioned in the lock wire channel 116. The anchor end 132 is inserted in the mounting orifice 114, thereby securing the lock wire 130 to the grip portion 110. Preferably, the anchor end 132 is first inserted into a bushing 136 which is in turn inserted into the mounting orifice 114. When positioned in the lock wire channel 116, the hook end 134 extends beyond the front end 124 of the grip portion 110. A central portion 133 of the lock wire 130 contacts the base 174 of the button 170, thereby holding the button 170 in the button orifice 112 and insuring the button 170 extends above the top surface 122 (FIG. 3B).

Figure 3C:
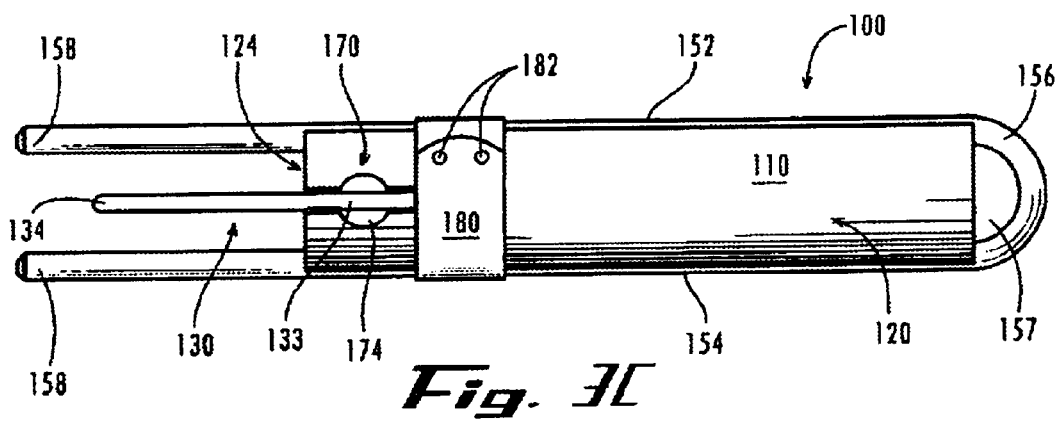

The support post wire 150 is positioned such that the first and second lengths 152, 154 are disposed, one in each of the pair of support post grooves 118. When the support post wire 150 is in position, the loop portion 156 is adjacent the back end 126 and the pair of support post ends 158 extends beyond the front end 124 (FIGS. 3A–3C). As shown, the loop portion 156 is a rounded curve. However, other shapes for the loop portion 156 are envisioned, i.e., it could be "squared off." The metal band 180 is disposed around the grip portion 110 and serves to hold the lock wire 130, support post wire 150 and button 170 in place. Preferably, the metal band 180 is secured to the grip portion 110 using tacks 182, and is adjacent the anchor end 132 and knurled portions 155.

Referring now to FIGS. 3A–3E, the fully assembled removable handle 100 is shown. Preferably, the loop portion 156 of the support post wire 150 forms an opening 157 with the grip portion 110. FIGS. 3A–3D show the lock wire in its engaged, or resting, position. FIG. 3E shows the button 170 in a depressed position which places the hook end 134 of the lock wire 130 in a disengaged position.

Figure 5A:
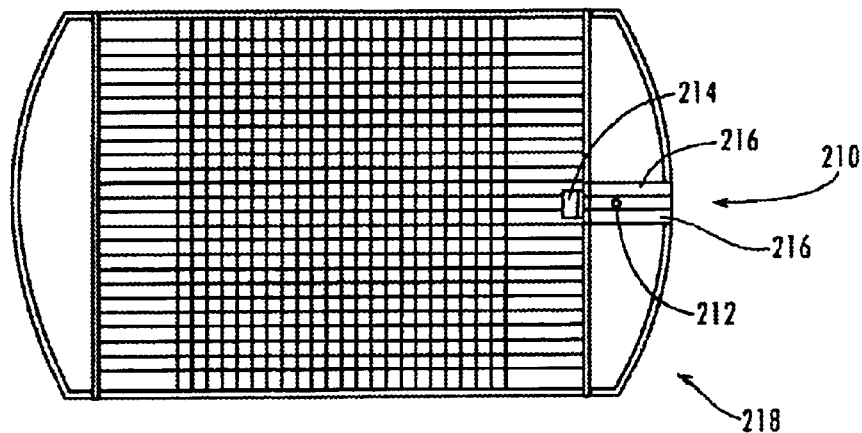
FIGS. 5A and 5B show a top plan and a side elevational view, respectively, of a shaker basket including the attachment bracket shown in FIGS. 4A–4C.
Figure 5B:
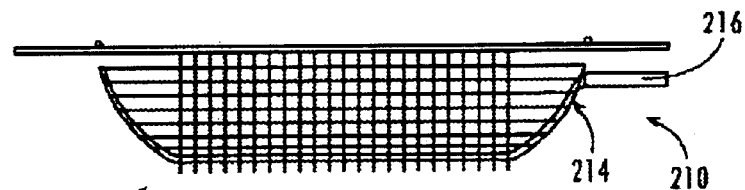
Figure 6:
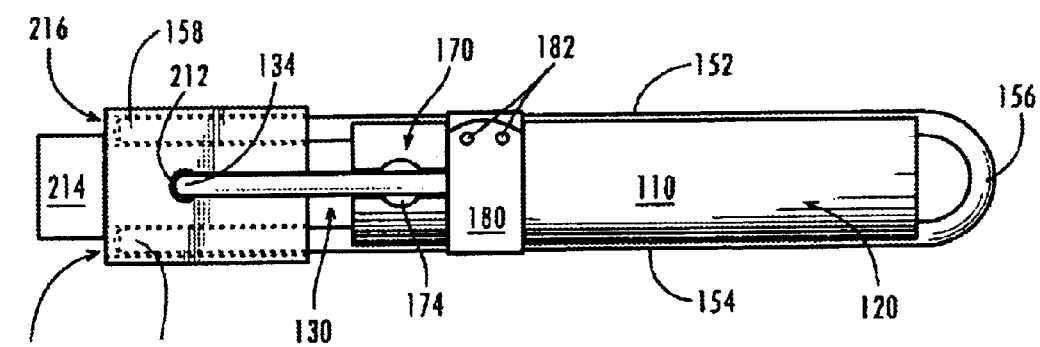
FIG. 6 shows a bottom plan view of the removable handle shown in FIGS. 3A–3E attached to the attachment bracket shown in FIGS. 4A–4C.
Figure 7A:
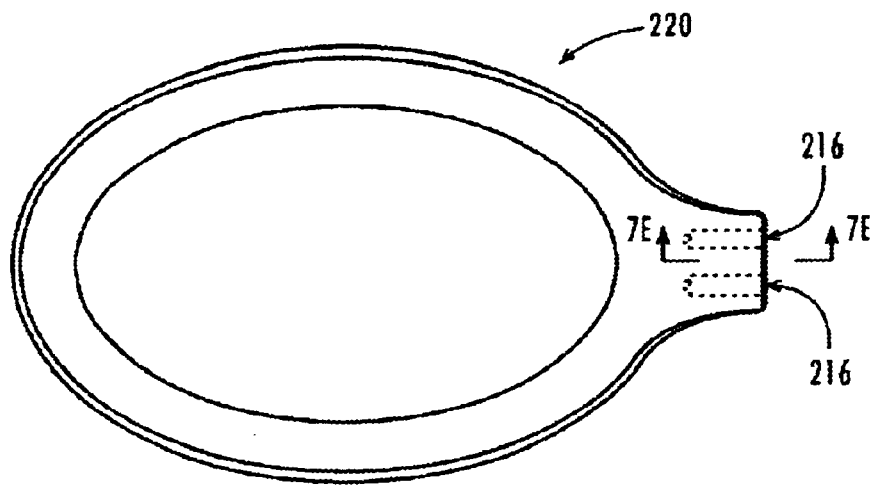
FIGS. 7A–7E show top plan, side elevational, bottom plan back end elevational, and partial cross-section, the section being taken along line VIIE—VIIE of FIG. 7A, views, respectively, of a fajita skillet for use with the removable handle shown in FIGS. 3A–3E.
Figure 7B:
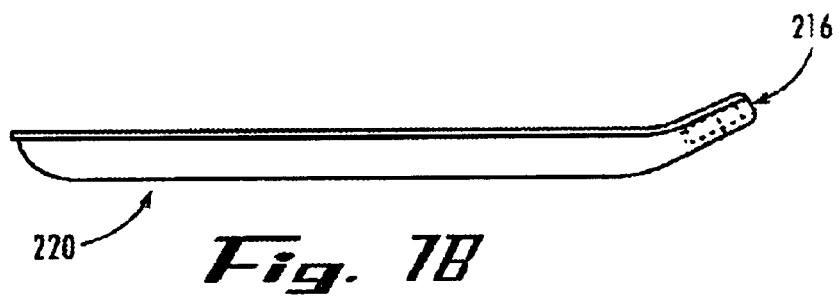
Figure 7C:
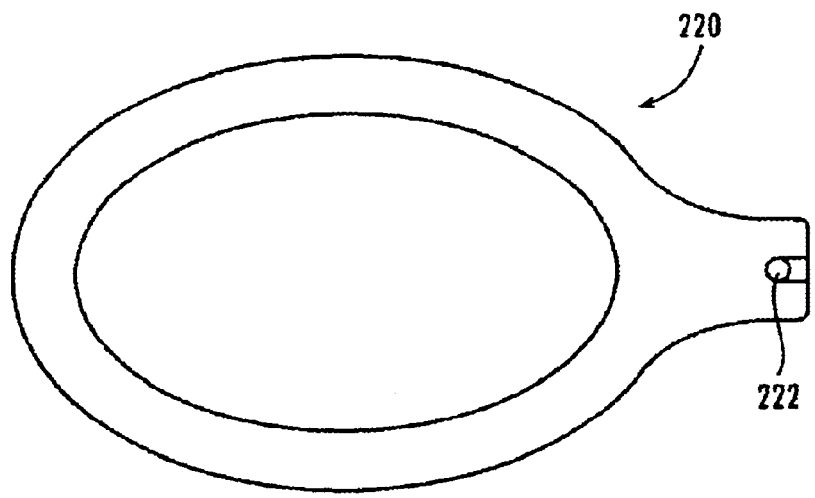
Figure 7D:
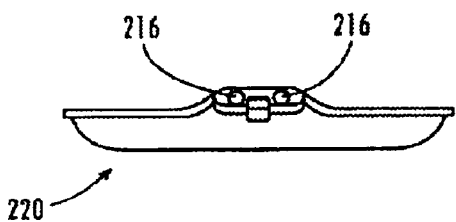
Figure 7E:
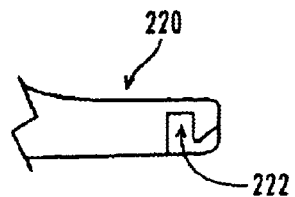

Referring now to FIGS. 4A–4C, an attachment bracket 210 for use with the removable handle 100 (FIGS. 3A–3E) is shown. Attachment bracket 210 includes a matching hole 212 configured to receive the hook end 134 of the lock wire 130, a tongue 214, and support channels 216. The tongue 214 can be secured to various cooking implements by any suitable means. FIGS. 5A and 5B show a shaker basket 218 including the attachment bracket 210. To attach the removable handle 100 to the attachment bracket 210 and its associated cooking implement, the user first depresses the button 170, as shown in FIG. 3E. Depressing the button 170 urges the lock wire 130 downward, subsequently urging the hook end 134 into its disengaged position. With the hook end 134 so positioned, the pair of support post ends 158 are inserted into the associated pair of support channels 216. After the pair of support post ends 158 have been inserted into the support channels 216 to the proper depth, the button 170 is released. Releasing the button 170 allows the lock wire 130 to return to its non-deflected, engaged position. In this position, hook end 134 is inserted into the matching hole 212 and secures the removable handle 100 to the attachment bracket 210 as shown in FIG. 6. To remove the removable handle 100, the button 170 is pressed once again, and with the hook end 134 in the disengaged position, the pair of support post ends 158 are withdrawn from the support channels 216.

Figure 8:
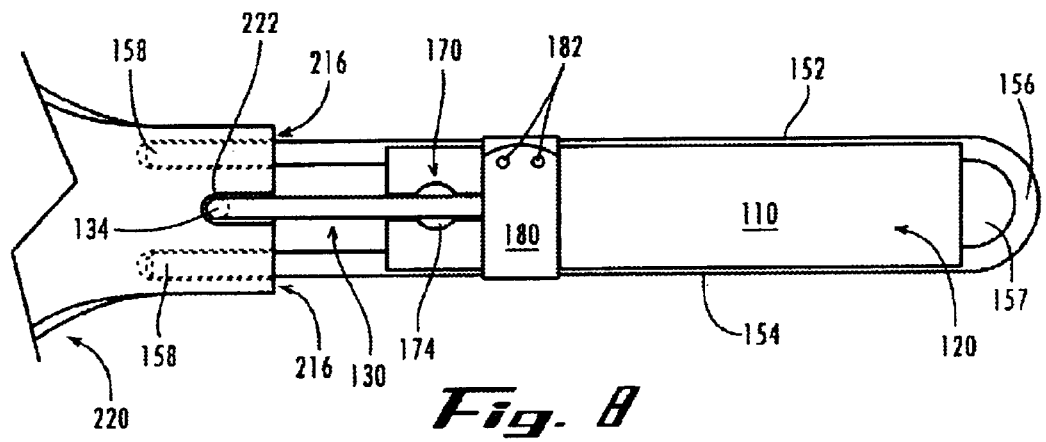
FIG. 8 shows a bottom plan view of the removable handle shown in FIGS. 3A–3E attached to the fajita skillet shown in FIGS. 7A–7E.

Referring now to FIGS. 7A–7E, a fajita skillet 220 for use with the removable handle 100 (FIGS. 3A–3E) is shown. Note that both the support channels 216 and retention recess 222 are formed integrally within the cooking implement. The removable handle 100 is attached to, and removed from, the fajita skillet 220 shown in FIGS. 7A–7E in the manner previously discussed regarding the attachment bracket 210 (FIGS. 4A–4C). Note, however, the hook end 134 engages a retention recess 222 formed on the fajita skillet 220, rather than a matching hole 212 as with the attachment bracket 210. FIG. 8 shows a bottom view of the removable handle 100 attached to the fajita skillet 220. The shaker basket 218 and fajita skillet 220 are selected merely for ease of description, and we in no way intended to limit the scope of the implements with which the removable handle can be used. It is intended for the removable handle 100 of the present invention to be used with a wide array of cooking implements.

It should be emphasized that the above-described embodiments of the present invention, particularly, any "preferred"

embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Thus, while an embodiment and modifications thereof have been shown and described in detail herein, various additional changes and modifications may be made without departing from the scope of the present invention.

We claim:

1. A removable handle for use with a cooking implement, comprising:

a grip portion having a top surface, a bottom surface, a front end, a back end, a button orifice, a mounting orifice, and a pair of support post grooves disposed on opposing sides of said grip portion and running longitudinally between said front end and said back end;

a lock wire including a hook end and an anchor end, said anchor end being disposed in said mounting orifice, said hook end being configured to engage the cooking implement;

a support post wire having a first length, a second length, and a pair of support post ends being configured for insertion into the cooking implement, said first length and said second length being parallel and having a loop portion disposed therebetween, each of said first length and said second length being respectively disposed, one in each of said pair of support post grooves;

a button disposed in said button orifice, said button being arranged and configured to deflect said hook end between an engaged position and a disengaged position; and a metal band disposed around said grip portion such that said first and said second lengths are secured in said pair of support post grooves and said anchor end is secured in said mounting orifice.

2. The removable handle of claim 1, wherein each of said first length and said second length further includes a knurled portion arranged and configured to prevent slippage between said support post wire and said pair of support post grooves.

3. The removable handle of claim 1, further comprising a bushing configured both for insertion into said mounting hole and receiving said anchor end.

4. The removable handle of claim 2, wherein said metal band is disposed over said mounting orifice and said knurled portions.

5. The removable handle of claim 2, wherein said grip portion is comprised of wood and said metal band is secured to said grip portion with tacks.

6. The removable handle of claim 1, wherein said loop portion is adjacent said back end.

7. The removable handle of claim 1, wherein said lock wire is disposed between said first and second lengths, and said hook end and said pair of support ends extend beyond said front end.

8. The removable handle of claim 1, further comprising a lock wire channel formed in said grip portion, running from said mounting hole to said front end and passing through said button orifice.

9. The removable handle of claim 1, wherein said grip portion is comprised of plastic.

10. The removable handle of claim 1, wherein said grip portion has a substantially oval cross-section.

11. A method of attaching a removable handle to a cooking implement, comprising the steps of:

pressing and holding a button such that a lock wire having a hook end is deflected into a disengaged position;

inserting a pair of support ends into a pair of support recesses formed in said cooking implement; and releasing said button such that said lock wire returns to an engaged position, wherein said hook end engages a portion of said cooking implement.

12. The method of claim 11, wherein said portion of said cooking implement further comprises a matching hole.

13. The method of claim 11, wherein said portion of said cooking implement further comprises a retention recess.

14. The method of claim 12, wherein said pair of support recesses and said matching hole are formed in a bracket, said bracket being secured to said cooking implement.

15. The method of claim 13, wherein said pair of support recesses and said retention recess are integral to said cooking implement.

16. A cooking implement including a removable handle, comprising:

a grip portion having a top surface, a bottom surface, a front end, and a back end;

a support post wire having a first support post end and a second support post end, said first and said second support post ends being parallel, said support post wire being securely attached to said grip portion;

a lock wire including a hook end and an anchor end, said anchor end being securely disposed in said grip portion;

a button disposed in said grip portion, said button being arranged and configured to deflect said hook end downwardly; and wherein said first and said second support post ends are arranged and configured for insertion into a pair of support recesses disposed on said cooking implement, and said hook end is arranged and configured to engage a portion of said cooking implement.

17. The cooking implement of claim 16, wherein said support post wire further comprises a loop portion disposed between said first and second support post ends, said loop portion extending beyond said back end.

18. The cooking implement of claim 16, wherein said portion of said cooking implement further comprises a retention recess, and wherein said pair of support recess and said retention recess are formed integrally with said cooking implement.

19. The cooking implement of claim 16, wherein said portion of said cooking implement further comprises a matching hole, and wherein said pair of support recesses and said matching hole are disposed on a bracket, said bracket being secured to said cooking implement.

20. The cooking implement of claim 16, further comprising a metal band disposed around said grip portion, said metal band being arranged and configured to secure said support post wire and said anchor end to said grip portion.

* * * * *